3,099,925
VARIABLE SPEED TRANSMISSION
Margaret S. Leonard, 330 W. Medlock Drive,
Phoenix, Ariz.
Filed Jan. 14, 1963, Ser. No. 251,428
6 Claims. (Cl. 74—372)

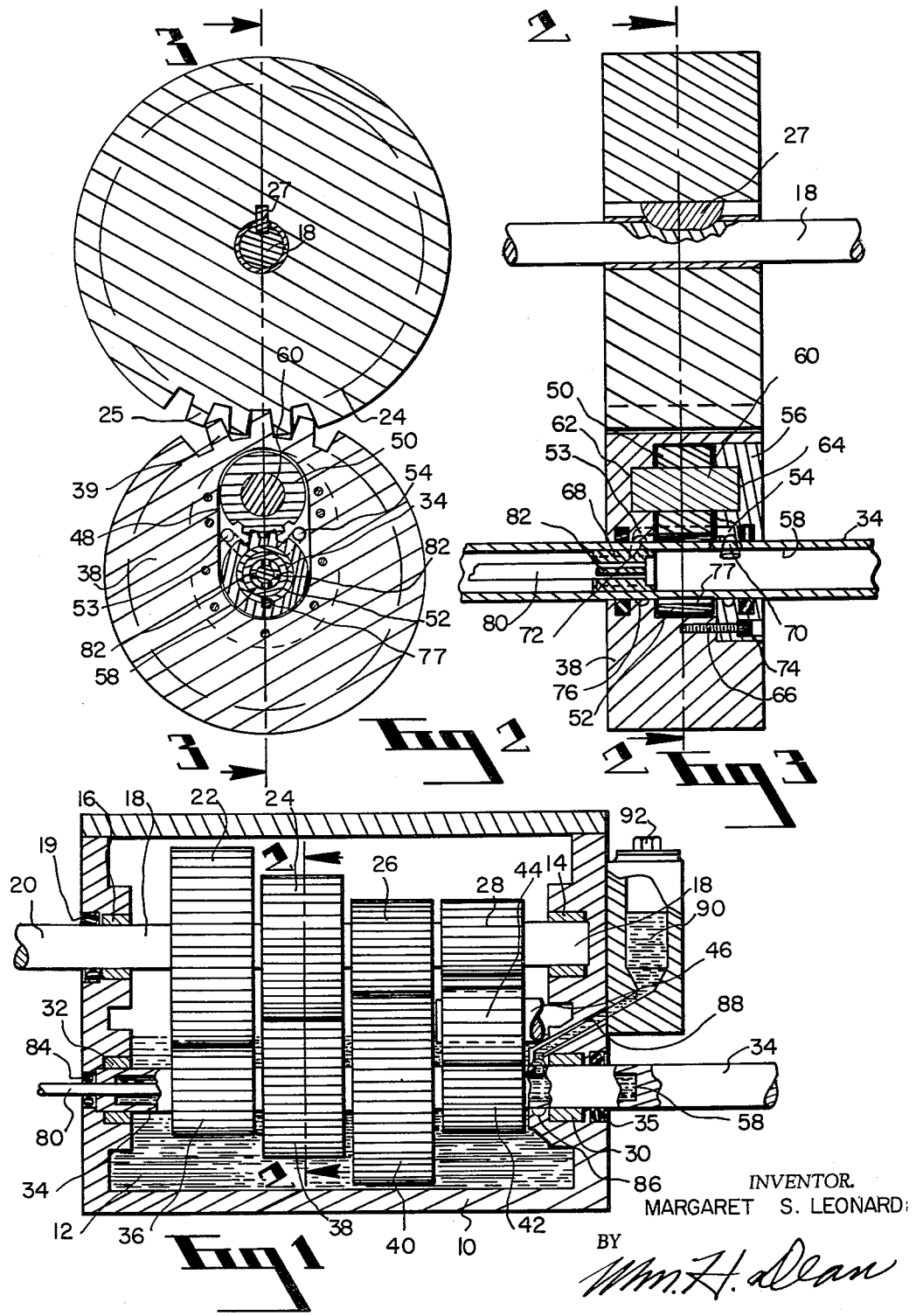

This invention relates to a variable speed transmission and more particularly to a variable speed transmission which may be used in various automotive or industrial installations for varying speed between input and output shafts.

It has been a problem to provide a compact variable speed transmission which provides for variable speeds between an input shaft relative to an output shaft and which also permits constant meshing of all gears of the transmission without sliding such gears into and out of mesh with each other.

Additionally, it has been a problem to provide precise control of constantly meshed variable speed transmissions in order to obtain smooth shifting from one positive gear reduction ratio to another.

It has been recognized that the alternate or selective locking of various sized gears to a shaft by hydraulic means may provide for direct drive and constant meshing of a variety of gear ratios with respect to input and output shafts having meshing gears, all of which provides for smooth flexible performance and avoids the necessity of sliding gears into and out of mesh with each other in order to change gear ratios.

Accordingly, it is an object of the present invention to provide a small compact lightweight variable speed transmission, particularly adapted for automotive, industrial, and other applications.

Another object of the invention is to provide a variable speed transmission having an input shaft and an output shaft; a plurality of gears on the input shaft which vary in diameter arranged in constant meshed relation with complemental gears on the output shaft to provide for a plurality of varying gear ratios between the input shaft and the output shaft and means for selectively locking gears to one of said shafts in order to determine and provide for relative speed ratios between the input shaft and the output shaft.

Another object of the invention is to provide a novel combination of constantly meshed gears and means for locking selectively such gears to one shaft in order to provide for clutching as well as gear ratio changing operations.

Another object of the invention is to provide a variable speed transmission wherein all of the gear means is constantly meshed to provide for varying speed ratios between the input shaft and the output shaft of the transmission whereby sliding engagement and disengagement of the teeth of the gears is avoided thereby preventing gear clash and tooth breakage.

Another object of the invention is to provide a very simple transmission involving only an input shaft and an output shaft and a reverse idler shaft, which shafts support all of the gears in the transmission to obtain several speeds forward and one reverse speed of the output shaft relative to a constant speed of the input shaft.

Another object of the invention is to provide a very novel means for clutch operation and selective gear ratio change operations which all may be made concurrently and simply by moving a hydraulic fluid control piston valve.

A further object of the invention is to provide a variable speed transmission which is very simple and economical of construction, efficient in operation, and which will not readily deteriorate or get out of order.

Further objects and advantages of the invention may be apparent from the following specification, appended claims, and accompanying drawings, in which:

FIG. 1 is a vertical sectional view of a variable speed transmission in accordance with the present invention and showing parts and portions of the shafts and gears in elevation to facilitate the illustration and showing, further, portions broken away and in section to amplify the illustration;

FIG. 2 is an enlarged fragmentary sectional view taken from the line 2—2 of FIG. 1; and FIG. 3 is a sectional view taken from the line 3—3 of FIG. 2, showing parts and portions fragmentarily and in elevation.

As shown in FIG. 1 of the drawings, the variable speed transmission of the present invention is provided with a gear case 10 carrying conventional lubricant 12 in the lower portion thereof.

Bearings 14 and 16 journal an input shaft 18 in the gear case 10 and an outwardly extending portion 20 of the shaft 18 may be coupled to a prime mover or power input means, such as an automotive engine, or other power supply.

Fixed on the input shaft 18 are spur gears 22, 24, 26, and 28. These gears 22, 24, 26, and 28 are fixed to the shaft 18 by any suitable means, such as conventional keys, splines, or equivalent structures known to those skilled in the art.

Bearings 30 and 32 journal an output shaft 34 in the gear case 10 below the input shaft 18.

Mounted concentrically on the output shaft 34 are gears 36, 38, and 40 which are in constant meshed relation with the gears 22, 24, and 26, respectively.

The gear 28 is disposed in constant mesh with a reverse idler 44 which is provided with a conventional bushing or bearing rotatably mounted on a fixed shaft 46, mounted in the gear case 10 in a manner conventional to common automotive transmission construction. This reverse idler shaft 46 supports the gear 44 so that it is in constant mesh with a spur gear 42 mounted concentrically on the shaft 34, as will be hereinafter described.

All of the hereinbefore mentioned gears may be spur gears of the conventional involute type or may be involute spur gears having helically arranged teeth or any other suitable geometry.

The gears 36, 38, 40 and 42 are all disposed to be positively coupled to the shaft 34 or may rotate freely thereon, as will be hereinafter described.

Referring to FIG. 2 of the drawings, it will be seen that the spur gear 38 is in mesh with the spur gear 24 and that these gears are held in radial juxtaposition relative to each other by means of the shafts 18 and 34 and that the involute teeth 25 of the spur gear 24 are in constant mesh with the involute teeth 39 of the gear 38.

A recess 48 contains smaller gears 50 and 52 which are arranged in the recess 48 to provide a constant displacement oil pump having a conventional outlet passage 53 and a conventional inlet passage 54, the passages 54 being disposed in a recess cover plate 56 shown in FIG. 3 of the drawings. The gear 52 is fixed externally to the shaft 34 which is provided with an internal bore 58 therein serving as an oil flow passage between the ports 53 and 54.

The spur gear 50 is rotatably mounted on a shaft 60 journalled in a recess 62 in the gear 38 and another recess 64 in the cover plate 56.

The cover plate 56 is flush with the side of the gear 38 and is secured thereto by means of recessed screws 66 having their heads in counter-bored holes in the cover plate 56.

A sleeve valve member 68 is slidable in the bore 58 of the shaft 34 and adapted to overlie ports 70 and 72 extending through the sidewall of the shaft 34. These ports 70 and 72 communicate with annular grooves 74 and 76 in the cover 56 and gear 38, respectively. Thus, the outlet 53, shown in broken lines in FIG. 3 beyond the plane of the section, communicates with the annular groove 76 while the port 54 communicates with an annular groove 74 and the piston 68 may be slidably moved to cover the ports 72 communicating with the groove 76 and the port 53 to shut off the outlet of the gear pump formed by the gears 50 and 52 in the recess 48. It will be appreciated that the gear 52 is fixed to the shaft 34 by means of a conventional key 77 so that when the outlet 53 of the gear pump is shut off, the gear 50 is prevented from rotating in the recess 48 around the axis of the shaft 60 and thus locks the gear 38 with relation to the shaft 34. In each of the gears 36, 38, 40, or 42, a gear similar to the gear 52 is keyed to the shaft 34 and a gear similar to the gear 50 is in mesh with the respective gear 52. These are each mounted in the recess 48 of each of the gears 36, 38, 40, and 42.

It will be noted that the smaller gears 36 and 42, as shown herein, are only shown in proportion by way of example. However, these gears normally are designed large enough to accept suitable hydraulic pump gears similar to the gears 50 and 52 which will fit within the diametric limits of the respective gears 36, 38, 40 and 42.

The valve member 68 is connected to a valve operating rod 80 by means of a plurality of radially disposed fins 82 which permit the bypass of fluid around the rod 80 through the interior of the valve member 68 so that the valve member 68 may be moved freely through the bore 58 of the shaft 34 from one position to another internally of the respective gears 36, 38, 40 and 42 in order to cause locking of them relative to the shaft 34.

The rod 80 extends outwardly of the housing or gear case 10 through a seal 84 and this rod 80 may be actuated by a speed governor or may be operated manually, as desired, in order to change gear ratios, as will be hereinafter described.

It will be seen from FIGS. 2 and 3 of the drawings, that the gear 24 is locked to the shaft 18 by a conventional key structure 27 and that the gears 22, 24, 26 and 28, all being locked to the shaft in this manner, provide positive driving thereof when power is applied to the outboard end 20 of the shaft 18.

Communicating with the bore 58 of the shaft 34 through an annular channel 86 in the gear case 10, is an oil reservoir passage 88 communicating with an oil reservoir 90 having a removable closure 92 communicating therewith.

It will be appreciated that this reservoir 90 provides for constant filling of the bore 58 of the shaft 34 and also for filling the cavities 48 around the gears 50 and 52 in the larger spur gears 36, 38, 40 and 42.

It will be appreciated that this oil supply system comprising the reservoir 90 may be provided with pneumatic pressure, if desired, to pressurize the cavities 48. Other application of pressure to the fluid may be utilized, if desired, in order to maintain positive displacement of these cavities around the gears 50 and 52.

In operation, the power input shaft 18 constantly rotates and when, for example, the gear 38 is locked to the shaft 34, as hereinbefore described, by stopping operation of the gear 50 and causing rotation of the gear 38, the output shaft 34 is driven at an intermediate speed.

When the control rod 80 is moved to cause the valve member 68 to shut off the outlet of the gear pump mechanism comprising gears 50 and 52 in the large gear 36, this gear will be locked to the shaft 34. This arrangement provides for high speed output of the shaft 34 while locking of the gear 40 to the shaft 34, by appropriate positioning of the valve member 68, will provide for a relatively low output speed of the shaft 34.

When the control rod 80 is moved to a position to carry the valve member 68 in the proximity of the outlet of the pump contained in the gear 42, it is locked to the shaft 34 and when meshing with the idler 44, which in turn meshes with the gear 28, the output shaft 34 is rotated in the opposite direction from that hereinbefore described. Thus, a reverse gear is provided in the transmission, according to the present invention.

Seals 19 and 35, in the gear case 10, are engaged with the input and output shafts 20 and 34, respectively, to prevent the leakage of lubricant 12 outwardly from the interior of the gear case 10.

It will be appreciated that the same lubricant 12 may be used in the reservoir 90 so that the materials will be compatible in the event very slight leakage occurs from the reservoir 90 and the various gears downwardly into the gear case 10.

It will be here noted that when the valve member 68 is moved out of interference with all of the ports 70 and 72, in the gears 36, 38, 40 and 42, the transmission may be in neutral position and when the valve member 68 is in position to shut off one of the ports 72, of one of the gears 36, 38, 40 and 42, the transmission is locked so that in the event it is used in connection with an automotive vehicle, for example, the engine compression will serve as a parking brake when one of the gears 36, 38, 40 or 42 is locked.

It will be further noted that movement of the valve member 68 serves not only as a gear changing mechanism, but also serves a combined function of a neutral transmission element as well as a clutching element. Thus, the shaft 20 may be coupled directly to a prime mover without a clutch and the rod 80, operating the valve member 68, may serve as a clutch since this valve member may gradually move over one of the ports 72 and thereby serve gradually to engage or lock up one of the gears 36, 38, 40 and 42 relative to the shaft 34.

Accordingly, it will be seen that the valve 68 functions as a gear changing device, a means for shifting the transmission into neutral, and as an engaging clutch mechanism, as well as a means for locking up the transmission to utilize the compression of the prime mover in connection with the shaft 20 as a parking brake.

It will be obvious to those skilled in the art that various modifications of the present invention may be resorted to in a manner limited only by a just interpretation of the following claims.

I claim:

1. In a variable speed transmission, the combination of: a casing; a pair of substantially parallel shafts rotatably mounted in said casing; a plurality of gears fixed to one of said shafts; and a second plurality of gears rotatably mounted on the other of said shafts; gear pump means in each of said second plurality of gears comprising a pump gear fixed to the respective shaft; a second pump gear in mesh with said first mentioned pump gear; and recess structure in a respective one of said gears on said respective shaft; port means communicating with the inlet and outlet of said gear pump means; said respective shafts being hollow and having port means communicating with the inlet and outlet port means of said gear pump means; and a control valve member slidable internally of said respective shaft and disposed to shut off flow of fluid through said pump means to thereby lock the respective gear to the respective shaft and thus drive a respective gear on the other of said shafts; said control valve member movable longitudinally of said shaft to shut off flow of oil through respective gear pumps in respective external gears to thereby vary the speed ratio between said shafts; a reverse idler disposed between adjacent gears on said shafts and meshing therewith to provide for reverse operation of said shafts with respect to the normal relative rotational directions of said shafts when any pair of the remaining gears are in operative driving relationship.

2. In a variable speed transmission, the combination of: a casing; a pair of substantially parallel shafts rotatably mounted in said casing; a plurality of gears fixed to one of said shafts; and a second plurality of gears rotatably mounted on the other of said shafts; gear pump means in each of said second plurality of gears comprising a pump gear fixed to the respective shaft; a second pump gear in mesh with said first mentioned pump gear; and recess structure in a respective one of said gears on said respective shaft; port means communicating with the inlet and outlet of said gear pump means; said respective shafts being hollow and having port means communicating with the inlet and outlet port means of said gear pump means; and a control valve member slidable internally of said respective shaft and disposed to shut off flow of fluid through said pump means to thereby lock the respective gear to the respective shaft and thus drive a respective gear on the other of said shafts; said control valve member moveable longitudinally in said shaft to shut off flow of oil through respective gear pumps in respective external gears to thereby vary the speed ratio between said shafts; a reverse idler disposed between adjacent gears on said shafts and meshing therewith to provide for reverse operation of said shafts with respect to the normal relative rotational directions of said shafts when any pair of the remaining gears are in operative driving relationship; fluid reservoir means communicating with the interior of said respective shaft for maintaining a fluid supply therein and in said gear pump mechanisms.

3. In a variable speed transmission, the combination of: a gear casing; a pair of substantially parallel shafts rotatably mounted therein; a plurality of varying diameter gears mounted concentrically of each of said shafts; said gears of one shaft being in constant mesh with the gears of the other shaft; all of the gears on one of said shafts having gear pump mechanisms therein; inlet and outlet means for each of said gear pump mechanisms communicating with the respective shaft; said respective shaft being hollow and having port means communicating with said inlet and outlet of said gear pump mechanisms; and a control valve member slidably mounted longitudinally and internally of said respective shaft to open and shut off said port means and said inlet and outlets of said gear pump mechanisms; each gear pump mechanism having one pump gear fixed to said respective shaft; each pump mechanism having a second gear in mesh with the first pump gear fixed to said shaft; and a confining recess structure for said pump gears to provide inlet and outlet sides relative to the rotation of said pump gears whereby said control valve may be moved longitudinally of said respective shaft for shutting off the outlet of any one of said pump mechanisms in any one of said gears to thereby lock the respective gear to the shaft and to positively drive the other shaft by means of a respective gear fixed thereon.

4. In a variable speed transmission, the combination of: a gear casing; a pair of substantially parallel shafts rotatably mounted therein; a plurality of varying diameter gears mounted concentrically of each of said shafts; said gears of one shaft being in constant mesh with the gears of the other shaft; all of the gears on one of said shafts having gear pump mechanisms therein; inlet and outlet means for each of said gear pump mechanisms communicating with the respective shaft; said respective shaft being hollow and having port means communicating with said inlets and outlets of said gear pump mechanisms; and a control valve member slidably mounted longitudinally and internally of said respective shaft to open and shut off said port means and said inlets and outlets of said gear pump mechanisms; each gear pump mechanism having one pump gear fixed to said respective shaft; each pump mechanism having a second gear in mesh with the first pump gear fixed to said shaft; and a confining recess structure for said pump gears to provide inlet and outlet sides relative to the rotation of said pump gears whereby said control valve may be moved longitudinally of said respective shaft for shutting off the outlet of any one of said pump mechanisms in any one of said gears to thereby lock the respective gear to the shaft and to positively drive the other shaft by means of a respective gear fixed thereon; means for supplying hydraulic fluid to the interior of said respective shaft and for filling said pump gear mechanisms to thereby maintain hydraulic locking facility for said gears on said respective shaft when said valve member is moved to shut off an outlet of one of said gear pump mechanisms.

5. In a variable speed transmission, the combination of: a casing; an input shaft rotatably mounted in said casing; a plurality of varying sized gears mounted concentrically on said shaft; an output shaft rotatably mounted in said casing and having a plurality of complemental gears disposed in constant meshed relation with the gears on said input shaft; hydraulic pump means in the gears on one of said shafts; said hydraulic pump means comprising a pump recess in each of said respective gears; a hydraulic pump member fixed on one of said shafts; port means extending from the recess of the respective shaft; said respective shaft being hollow and having port means communicating with said port means in communicating with said recess; and a control valve member slidably mounted internally of said respective shaft to shut off said port means and to thereby prevent relative rotation of said hydraulic pump member and the gear in which it is mounted.

6. In a variable speed transmission, the combination of: a gear casing; a pair of substantially parallel shafts rotatably mounted therein; a plurality of varying diameter gears mounted concentrically of each of said shafts; said gears of one shaft being in constant mesh with the gears of the other shaft; all of the gears on one of said shafts having hydraulic pump mechanisms therein; inlet and outlet means for each of said hydraulic pump mechanisms communicating with the respective shaft; said respective shaft being hollow and having port means communicating with said inlet and outlet of said hydraulic pump mechanisms; and a control valve member slidably mounted longitudinally and internally of said respective shaft to open and shut off said port means and said inlet and outlets of said hydraulic pump mechanisms; each hydraulic pump mechanism having a second gear in mesh with the first hydraulic pump member fixed to said shaft; and a confining recess structure for said hydraulic pump mechanisms to provide inlet and outlet sides relative to the rotation of said hydraulic pump mechanisms whereby said control valve may be moved longitudinally of said respective shaft for shutting off the outlet of any one of said hydraulic pump mechanisms in any one of said gears to thereby lock the respective gear to the shaft and to positively drive the other shaft by means of a respective gear fixed thereon.

References Cited in the file of this patent

UNITED STATES PATENTS

| | | |
|---|---|---|
| 1,368,476 | Bovee | Feb. 15, 1921 |
| 3,049,207 | Maier | Aug. 14, 1962 |